United States Patent [19]

Szadkowski

[11] Patent Number: 4,846,488
[45] Date of Patent: Jul. 11, 1989

[54] SPRING DRIVE AND SPRING DRIVE SCOOTER

[76] Inventor: Andrzej Szadkowski, 1825 Forest Valley Dr., Fort Wayne, Ind. 46815

[21] Appl. No.: 77,205

[22] Filed: Jul. 24, 1987

[51] Int. Cl.$^4$ .............................................. B62M 1/04
[52] U.S. Cl. .................................... 280/221; 280/214; 280/251; 280/255; 280/215
[58] Field of Search .............. 280/212, 214, 221, 251, 280/252, 255, 253, 215

[56] References Cited

U.S. PATENT DOCUMENTS

| | | | |
|---|---|---|---|
| 1,867,731 | 7/1932 | Clarke | 280/215 |
| 3,285,618 | 11/1966 | Welch | 280/251 |
| 4,124,222 | 11/1978 | Moe et al. | 280/255 |
| 4,582,342 | 4/1986 | Lew et al. | 280/255 |

Primary Examiner—Charles A. Marmor
Assistant Examiner—Donn M. Grehan
Attorney, Agent, or Firm—David L. Ahlersmeyer

[57] ABSTRACT

A spring drive and a spring drive scooter for use by an operator. The spring drive and spring drive scooter have a frame, a resilient member connected to the frame, a pedal, and a movement. The pedal is supported by the resilient member. The pedal is disposed to bear the operator. The pedal is capable, together with the operator, of oscillatory motion relative to the frame in response to at least roughly periodic impulses supplied to the pedal by the operator at a range of frequencies including a resonant frequency. The movement is connected to the frame and includes a final driven member. The movement is actuated by reciprocation of the pedal, the movement is capable of converting oscillatory motion of the pedal into circular motion of the final driven member.

1 Claim, 3 Drawing Sheets

SPRING DRIVE AND SPRING DRIVE SCOOTER

BACKGROUND OF THE INVENTION

The present invention pertains to drive mechanisms and scooters utilizing the same and more particularly to a spring drive and a spring drive scooter.

Mechanical springs are used in machines to exert force, to provide resilience, and to move and store energy. Mechanical systems possessing mass and elasticity are capable of vibration. Although vibrations in general are undesirable, in some uses, vibrations are desired and are enhances with mechanical springs; for example, pogo sticks and vibratory hammers. Motion of the working member in these devices is reciprocatory.

Scooters, bicycles and similar devices have utilized a variety of mechanisms to enable an operator to provide propulsion for the vehicle. Most such vehicles, like ordinary bicycles, use a pair of offset cranks connected to a chain and sprockets or to a drive wheel and require greatly similar motions of the operator for their use.

Conventional scooters have generally dispensed with any mechanism in favor of the operator's foot. This differing operator motion separates conventional scooters and the like, such as skateboards, into a different category of vehicles from bicycle like vehicles.

In still another kind of vehicle, designed for young children, the frame of the vehicle itself is elastic and has wheels on the bottom. The operator provides for motion by bouncing on the elastic vehicle which then rolls slightly. This bouncing motion is enjoyable for the operator, however, older children quickly lose interest, since the vehicle makes little forward progress unless the operator also pushes with his feet.

It is therefore highly desirable to provide an improved spring drive and an improved spring drive scooter.

It is also highly desirable to provide an improved spring drive and an improved spring drive scooter which provide for reciprocatory motion of the operator and circular motion of the working member.

It is also highly desirable to provide an improved spring drive and an improved spring drive scooter which provide for reciprocating motion of the operator, relative to the frame of the vehicle, and for at least moderate forward propulsion of the spring drive scooter or other vehicle.

It is also highly desirable to provide an improved spring drive and an improved spring drive scooter in which reciprocation of the pedal and operator is driven by periodic or roughly periodic impulses supplied to the pedal by the operator.

It is also highly desirable to provide an improved spring drive and an improved spring drive scooter in which the operator can vibrate a pedal and himself at a resonant frequency.

It would finally be highly desirable to provide an improved spring drive and an improved spring drive scooter which meet all of the above-desired features.

SUMMARY OF THE INVENTION

It is an object of the invention to provide an improved spring drive and an improved spring drive scooter.

It is another object of the invention to provide an improved spring drive and an improved spring drive scooter which provide for reciprocatory motion of the operator and circular motion of the working member.

It is another object of the invention to provide an improved spring drive and an improved spring drive scooter which provide for reciprocating motion of the operator, relative to the frame of the vehicle and for at least moderate forward propulsion of the spring drive scooter or other vehicle.

It is another object of the invention to provide an improved spring drive and an improved spring drive scooter in which reciprocation of a pedal and operator is driven by periodic or roughly periodic impulses supplied to the pedal by the operator.

It is another object of the invention to provide an improved spring drive and an improved spring drive scooter in which the operator can vibrate a pedal and himself at a resonant frequency.

It is finally an object of the invention to provide an improved spring drive and an improved spring drive scooter which meet all of the above-desired features.

A spring drive and a spring drive scooter for use by an operator. The spring drive and spring drive scooter have a frame, a resilient member connected to the frame, a pedal, and a movement. The pedal is supported by the resilient member. The pedal is disposed to bear the operator. The pedal is capable, together with the operator, of oscillatory motion relative to the frame in response to at least roughly periodic impulses supplied to the pedal by the operator at a range of frequencies including a resonant frequency. The movement is connected to the frame and includes a final driven member. The movement is actuated by reciprocation of the pedal. The movement is capable of converting oscillatory motion of the pedal into circular motion of the final driven member.

BRIEF DESCRIPTION OF THE DRAWINGS

The above-mentioned and other features and objects of this invention and the manner of obtaining them will become more apparent and the invention itself will be better understood by reference to the following description of an embodiment of the invention taken in conjunction with the accompanying drawings wherein.

DESCRIPTION OF A SPECIFIC EMBODIMENT

Figure 1:
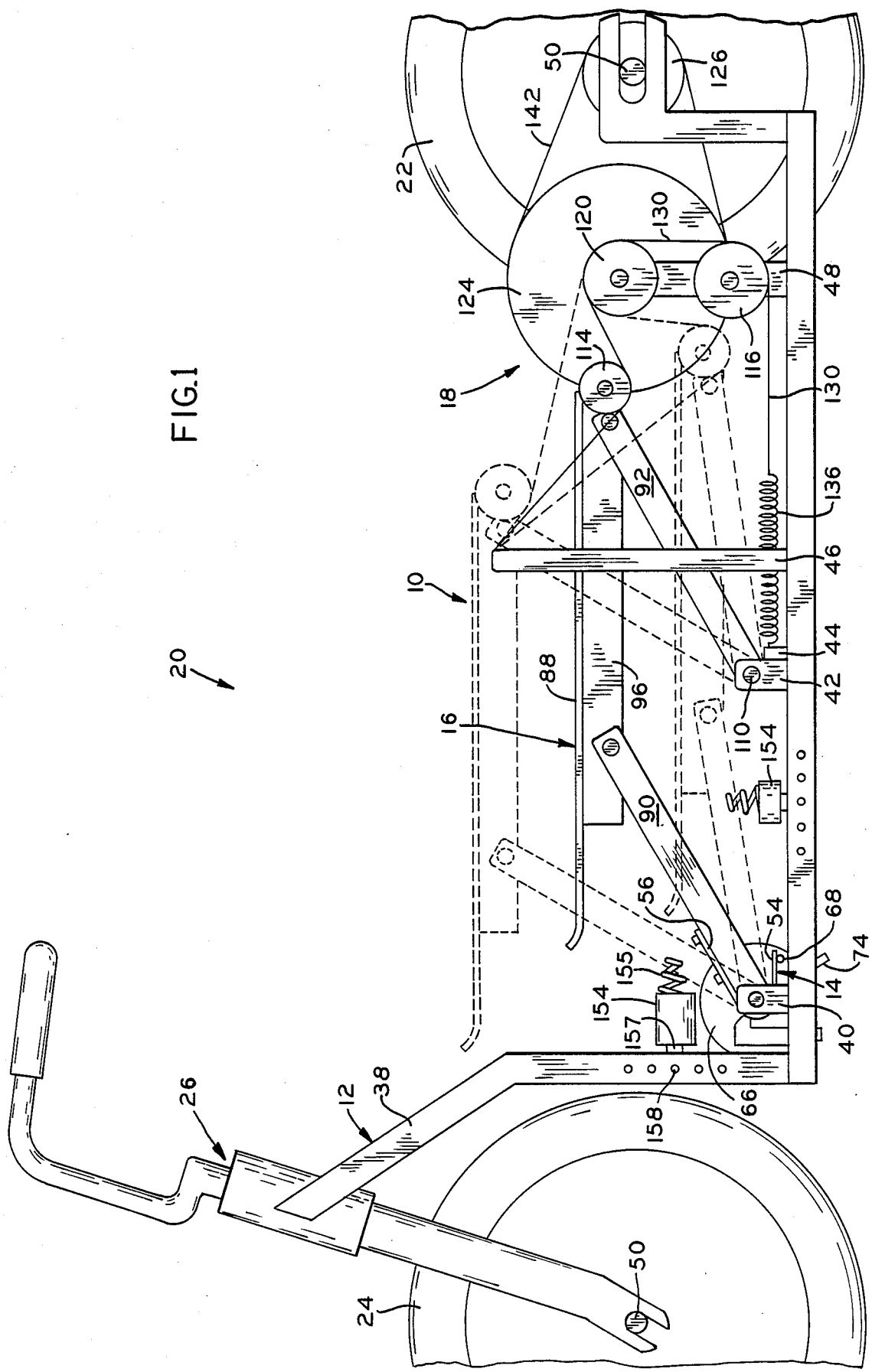
FIG. 1 is a side plan view of an improved spring drive scooter of the invention which includes an improved spring drive of the invention. Frame members have been reduced in size and reinforcement frame members have been eliminated for clarity. The pedal is shown in solid lines in a rest position and in dashed lines at upper maximum displacement and lower maximum displacement positions. The distance of travel of the pedal is exaggerated for clarity.
Figure 2:
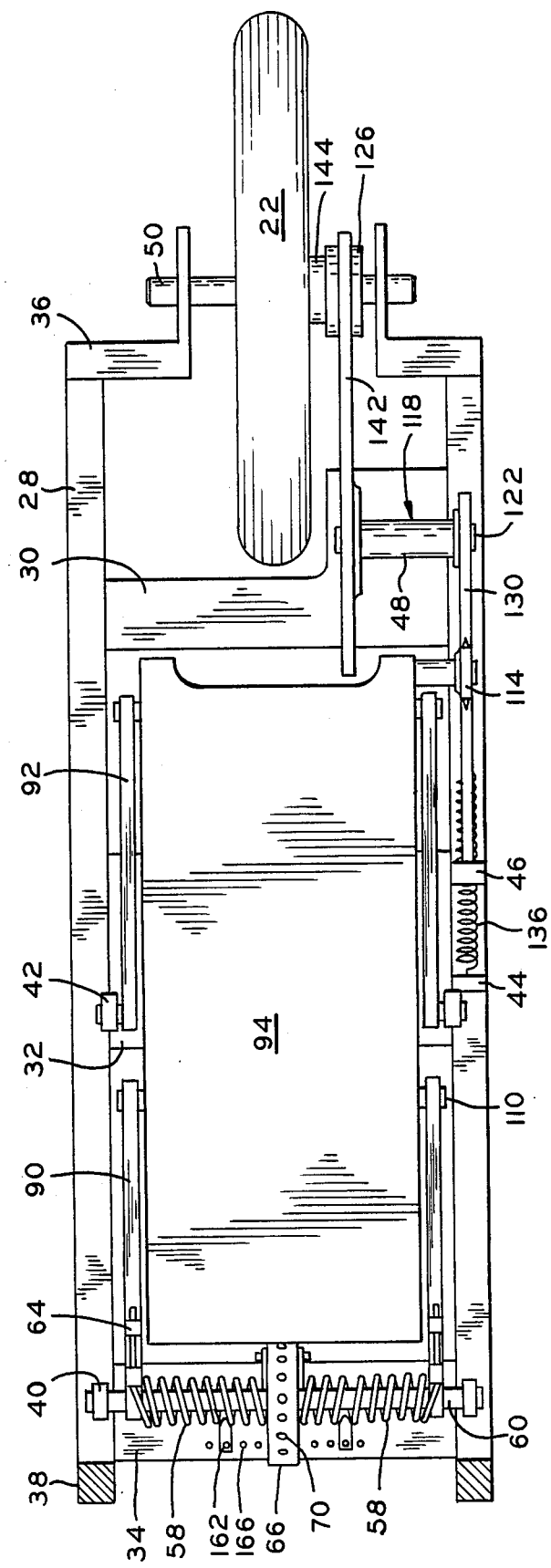
FIG. 2 is a top plan view of a modified spring drive scooter of the invention with part of an upper frame member, front wheel and steering mechanism deleted.

In an exemplary embodiment of the spring drive of the present invention, as shown in FIGS. 1 and 2, a spring drive scooter, incorporating a spring drive generally designated 10, includes a frame 12 to which a resilient member 14 is attached. In the preferred embodiment of FIGS. 1 and 2, resilient member 14 comprises a pair of torsion springs, although other resilient member may be utilized. Resilient member 14 supports a pedal 16, which is positioned to actuate a movement 18 upon displacement of pedal 16. Movement 18 includes, as a working member, a final driven wheel 22 at the rear of scooter 20. During operation of scooter 20, pedal 16 vibrates with an operator in response to impulses supplied by the operator to pedal 16.

Frame 12 also includes a front wheel 24 and a steering mechanism 26. Furthermore, pedal 16 may or may not be directly connected to frame 12. While spring drive 10 of the present invention is being described herein in connection with scooter 20 of the preferred embodiment, it is appreciated that movement 18 could also include, as a working member, a propeller or paddle wheel adapted to propel a boat. Spring drive 10, according to the present invention, would also be put to a non-mobile use, such as driving a fan blade.

Frame 12 holds resilient member 14, pedal 16, and movement 18 in position relative to each other and supports resilient member 14, pedal 16, movement 18, and the operator. Frame 12 is sufficiently rigid and strong to withstand the forces placed on it by operation of the spring drive 10 of the invention.

Frame 12 may take a variety of forms depending upon how the spring drive 10 of the invention is used, operator needs and strength of materials used. A frame 12, shown in FIGS. 1 and 2, has a pair of opposed side frame members 28, cross frame members 30, 32, 34, a pair of opposed rear frame members 36, a pair of opposed front frame member 38, pivoting steering mechanism 26, front wheel 24, support member pairs 40 and 42, and support members 44, 46, and 48. Reinforcing frame members have been deleted and other frame members reduced in size for clarity.

Since the operator of the spring drive scooter 20 of the invention stands on pedal 16, frame 12 may be underslung, that is, predominantly below the level of a pair of wheel axles 50, to lower the center of gravity of the spring drive scooter 20 of the invention and thus increase stability.

Figure 3:
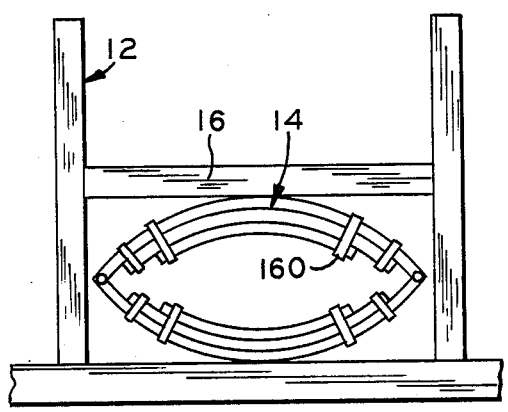
FIGS. 3-9 are diagrammatical views of modified spring drives of the invention illustrating resilient members, pedals and a portion of the frames.
Figure 4:
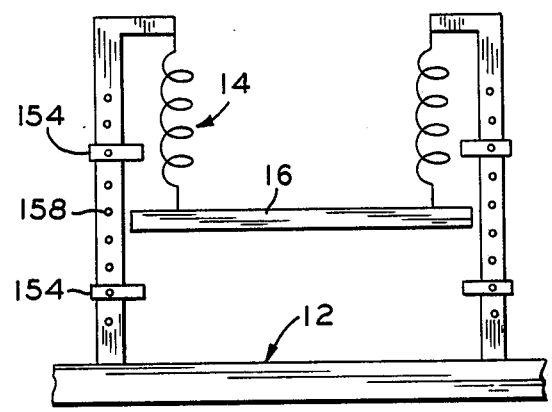
Figure 5:
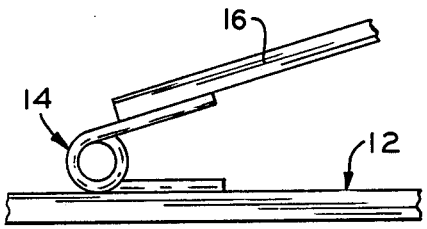
Figure 6:
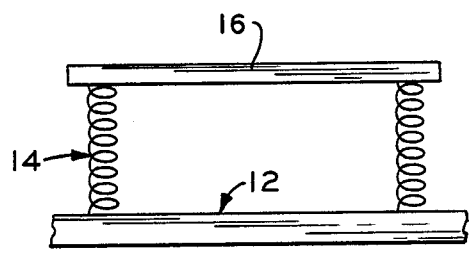
Figure 8:
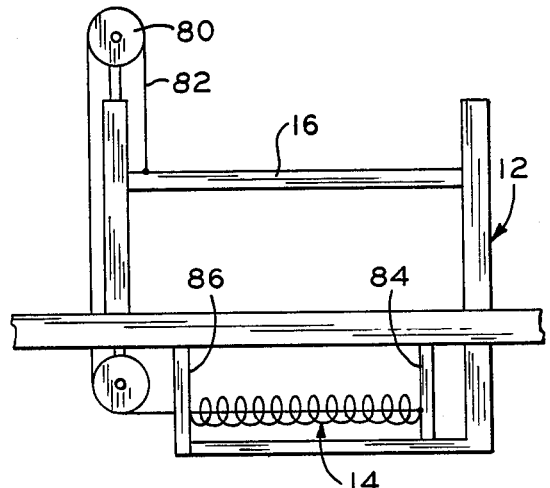
Figure 7:
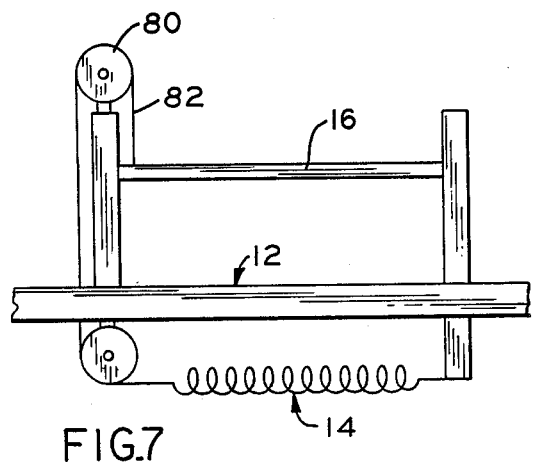
Figure 9:
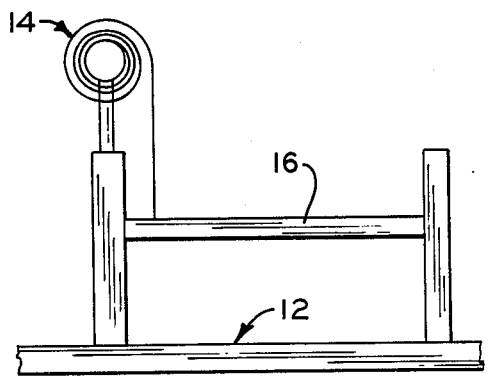

Resilient member 14, which is connected to frame 12, includes one or more springs which can take a variety of forms. The spring or springs may be torsion springs, as shown in FIGS. 1–2 and 5; multi-leaf springs, as shown in FIG. 3; vertically disposed tension springs, as shown in FIG. 4; vertically disposed compression springs, as shown in FIG. 6; a horizontally disposed tension spring, as shown in Figure 7; a horizontally disposed compression spring, as shown in FIG. 8; or a spiral spring, as shown in FIG. 9. Other alternatives could also be used, such as torsion bars, air springs, and the like.

In FIGS. 7 and 8 resilient member 14 includes pulleys 80 and cable 82. In FIG. 8, resilient member 14 also includes spring end 84 and compression stop 86. Spring end 84 is connected to the end of a compression spring and is moveable along frame 12. Compression stop 86 is a portion of frame 12 through which cable 82 extends and against which the compression spring can be compressed.

It is convenient that resilient member 14 be connected or anchored to frame 12 such that a fixed portion 54 of resilient member 14 may remain in a constant position relative to frame 12; while a moving portion 56 of resilient member 14, which is connected to pedal 16, may flex with movement of pedal 16. Such a resilient member is shown in FIG. 1 and 2.

In the form of spring drive scooter 20, shown in FIGS. 1 and 2, resilient member 14 has torsion springs 58 wound around a spring shaft 60. Support members 40 hold spring shaft 60, which is fixed in position and not free to rotate. The outer ends of torsion springs 58 are rigidly joined to pedal 16 by fasteners 64. Torsion springs 58 are separated by an adjuster 66 having restraining pins 68, which hold fixed portions 54 in fixed position relative to frame 12 during operation of spring drive scooter 20. When spring drive scooter 20 is not in use, adjuster 66 may be rotated around spring shaft 60 to alter the position of fixed portions 54. Adjuster 66 includes a plurality of holes 70 in the outer rim thereof to receive a fastener 74 extending through cross frame member 34 to hold adjuster 66 in a selected position.

Pedal 16 holds the operator during use of the spring drive 10 of the invention. Pedal 16 has a size and shape sufficient to receive the operator and pedal 16 should desirably be sufficiently rigid to not distort under the operator's weight during use of the spring drive 10, but desirably weighs much less than the operator.

Pedal 16 and the structures that connect pedal 16 to frame 12 may be formed in a variety of ways, as shown in the preferred embodiment of FIGS. 1 and 2, and the alternative embodiments of FIGS. 3–8. Pedal 16 may be movable solely in a vertical direction, as shown in FIGS. 3, 7, 8, and 9 or predominantly in a vertical direction, as in FIGS. 4 and 6, or up and forward and down and back as shown in FIGS. 1 and 2. Pedal 16 may rotate as shown in Figure 5.

A convenient form of pedal 16 is shown in FIGS. 1 and 2. Pedal 16 has a platform 88 and two pair of links 90, 92 which act as two parallel four bar linkages with frame 12 acting as the fourth bars. Platform 88 has a top surface 94 upon which the operator stands and a support portion 96 beneath platform 88 for bracing.

The lower ends of forward links 90 are each pivotably connected to a support member 40. The upper ends of forward links 90 are each pivotably connected to the forward end of support portion 96. The lower ends of rear links 92 are each pivotably connected to a support member 42. The upper ends of rear links 92 are pivotably connected to the rear end of support portion 96 of platform 88. A plurality of pivot connectors 110 are shown in FIGS. 1 and 2, which facilitate each of the aforementioned pivot connections. Top surface 94 of platform 88 may include measures to help the operator retain his feet on the pedal 16. Examples of such features are use of anti-slip materials on.

Pedal 16 is shown in FIG. 1 in three position: a rest position indicated by solid lines and upper and lower maximum limit positions indicated by dashed lines. The positions of first linear member 130 when pedal 16 is in the upper maximum limit position, the rest position and the lower maximum limit position are indicated by dashed, solid, and dashed lines, respectively.

Upper and lower maximum limit positions and maximum displacement of pedal 16 in each direction of vibration are determined by resilient member 14 or, alternatively, by a pair of limiters 154, or both in combination. If resilient member 14 provides that limit on displacement, then maximum displacement will be determined by a maximum flection of a spring or springs 52 of resilient member 14.

Limiters 154 may instead provide the limit on displacement of pedal 16. Limiters 154 may be resilient or non-resilient. It is desirable that limiters 154 be resilient. Each may include a limiter spring 155, which has a stiffness that increases rapidly as the limiter spring 155 flexes. Such a limiter spring 155 may, for example, be a conical coil spring or a block of elastomer with similar characteristics or the like. Limiter springs 155 may be attached to mounted members 157.

Resilient limiters 154 are flexed by, movement of pedal 16 from a forstalling position, in which resilient limiters 154 are contacted but not compressed, to the respective maximum limit position in which limiters 154 are fully compressed.

Limiters 154 may be positioned on frame 12 or pedal 16 or elsewhere to limit travel of pedal 16. Limiters 154 may be adjustable to allow the distance of travel, maximum amplitude of displacement, and maximum amplitude of velocity, of pedal 16 to be varied. Limiters 154 are shown, in FIGS. 1 and 4, each movable attached to frame 12 by a fastener which extends through one of a plurality of holes 158 in frame 12.

The spring drive 10 of the invention may utilize a movement to convert or modify the motion produced by pedal 16 as desired. Movement 18 is to convert reciprocating motion of pedal 16 into circular motion of final driven wheel 22. To rotate the final driven wheel 22, movement 18 may include combinations of various types of mechanisms such as: belt, chain, and gear drives; cam, lever, lever-ratchet, and screw mechanisms; impulse drives; hydraulic, pneumatic, and electric devices, etc. Movement 18 may include a conventional clutch mechanism, which permits movement of a final driven wheel 22 in only one direction.

It is convenient to relate the mechanical performance of the spring drive 10 to the linear circumferential velocity of wheel 22 in its rotation and to define the mechanical advantage of movement 18 as a ratio of the linear instanteous or maximum speed of pedal 16 to that of final driven wheel 22.

In the case of the spring drive scooter 20, the final drive ratio of movement 18 is selected as a maximum of one to provide operation of scooter 20 at a desired speed and to reduce forces exerted on pedal 16 without any change in the performance of scooter 20.

Free play of a movement 18, for example, backlash of a geared movement 18, places a limit on minimum displacement and minimum total travel of pedal 16 below which reciprocation of pedal 16 produces no rotation of final driven wheel 22 or other output.

Movement 18 may, in the case of the spring drive scooter 20 of the invention, convert reciprocating motion of pedal 16 into uni-directional circular motion of final driven wheel 22 either continuously or intermittently.

A convenient movement 18 is shown in FIGS. 1 and 2. In order to utilize this movement 18, pedal 16 includes a circular pedal member 114, which is rotatably mounted to support portion 96 of pedal 16. Offset from and below circular pedal member 114 is a secondary circular member 116. Above secondary circular member 116 is a torque transfer shaft assembly 118 which and an outer circular portion 120, a connector shaft 122 and an inner circular portion 124. Behind inner circular portion 124 of main circular member 118 is a drive hub 126 which is connected to final driven wheel 22. Axle 50 is fixed to frame 12 and final driven wheel 22 may rotate around axle 50.

Final driven wheel 22 may include an overrunning clutch 144 such as a ratchet and pawl mechanism, which as in the case of a conventional multi-speed handbraked bicycle, provides for the disengagement of final driven wheel 22 from drive hub 126 when drive hub 126 is moving slower than final driven wheel 22 or in the opposite direction of rotation.

A first linear connector 130 extends below circular pedal member 114 from a point of attachment at the upper end of support member 46, over outer circular portion 120 of shaft assembly 118, over secondary circular member 116, through an opening (not shown) in the lower end of support member 46, to a secondary spring 136. As shown in FIGS. 1 and 2, one inner end of secondary spring 136 is connected to support member 44, and the other end is connected to first linear connector 130.

It is desirable that secondary spring 136 be much less stiff; that is, less able to resist deflection than resilient member 14, so that the effect of secondary spring 136 on movement of pedal 16 will be negligible. Secondary spring 136 is sufficiently stiff to maintain pedal 16 in engagement with first linear member 130. If the effect of secondary spring 136 on pedal 16 is not negligible, then secondary spring 136 acts in part as a component of movement 18.

Second linear connector 142 extends over inner circular portion 124 of main circular member 118 and over drive hub 126 and is continuous.

Linear connectors 130, 142 and circular members 114, 116, and inner and outer circular portions 120, 124 are chains and sprockets or, alternatively, may use other applicable machine elements such as belts; rollers; gears, planetary or otherwise; pulleys; levers; impulse drive's, one-way clutches, etc.

Details of an example of the movement 18 shown in FIGS. 1 and 2 could be outer circular portion 120 being a sprocket with 14 teeth, inner circular portion 124 being a sprocket with 36 teeth, drive hub 126 having a sprocket with 16 teeth, final driven wheel 22 having a diameter of 16 inches and circular pedal member 114 being a sprocket with 14 teeth. The mechanical advantage is about one to thirty.

The operator is supported by pedal 16, which is supported by resilient member 14. The operator, pedal 16 and resilient member 14 reciprocate together. The displacement of pedal 16 actuates movement 18.

When the operator steps onto pedal 16 and remains still until all motion of resilient member 14 ceases, pedal 16 shows a static displacement from an unloaded position to a rest position. This vertical displacement of pedal 16 under the weight of the operator is opposed by resilient member 14 and varies with the stiffness of resilient member 14. When the operator supplies impulses, pedal 16 may vibrate about the rest position or about another equilibrium position. The static displacement may be over a distance greater than the maximum displacement of pedal 16 from the rest position, during vibration of pedal 16 and the operator.

Resilient member 14 may be "linear" or "non-linear". If resilient member 14 is "linear" its stiffness may be defined by a spring constant or spring rate "k" which is equal to the ratio of an applied force to deflection of a single spring which could replace resilient member 14. If resilient member 14 is "non-linear" then that ratio of applied force to deflection varies with deflection. A spring that is non-linear over a large range of deflection may be roughly linear over a narrower range. In some cases, it may be desirable, if resilient member 14 is non-linear, that the stiffness of resilient member 14 decrease with increasing displacement of pedal 16.

The stiffness of resilient member 14 may be adjustable if desired as, for example, shown in Figure 3 in which leaves 52 of springs 52 of a modified spring drive are joined together by fasteners 160 which allow the number of leaves in that resilient member 14 to be changed as desired to change the stiffness.

Stiffness of resilient member 14 may also be adjusted if the springs used are coil springs, as in FIGS. 1 and 2, by changing the number of active coils, by interpositioning rigid arms 162 between coils of springs 58. Arms 162 are movable mounted in fixed relation to frame 12 with fastners which extend through one of a plurality holes 166. Stiffness of resilient member 4 may also be adjusted in other ways such as by changing the active length of leaf springs.

The operator has a mass borne by pedal 16 and is able to input at least roughly periodic impulses to pedal 16. The input or inputs provided by the operator to pedal 16 during a cycle together provide a single impulse, which is an integration of the forces applied in the inputs over the time of the cycle.

The operator supplies impulses in order to start reciprocating and keep reciprocating the pedal 16 and himself. The impulses are at recognizable regular rather than irregular intervals and are at least roughly periodic.

While it is envisioned that the spring drive 10 of the invention would be most useful in a spring drive scooter 20 of the invention operated for amusement or exercise or transportation by a child or adult, the spring drive 10 of the invention is not limited to the spring drive scooter 20 of the invention nor to use by a human operator. The operator could be, for example, two persons acting in unison or a mechanical device or an animal. Similarly, there are no limitations as to size of the spring drive 10 and spring drive scooter 20 of the invention so long as the drive 10 and scooter 20 can operate.

In the case of the particular embodiment shown in FIGS. 1 and 2, impulses can be supplied to pedal 16 by the operator shifting his center of gravity downward by bending his legs or upward by straightening his legs or by the operator shifting weight onto or off of frame 12.

Desirable inputs would be a fraction of the weight of the operator, such as less than about one-third of the weight of the operator. Even more desirable inputs would be less than about one-eighth of the weight of the operator.

If the operator borne by the pedal 16 in its rest position supplies an impulse to pedal 16, movement of pedal 16, and the operator, over an amplitude of displacement occurs flexing, that is, storing energy in resilient member 14, actuating movement 18 and providing operation of final driven wheel 22. The change in energy stored in resilient member 14 is equal to work of input forces supplied by the operator reduced by work of useful or output forces of final driven wheel 22 and by energy dissipated through friction in all links or parts of pedal 16, resilient member 14, and movement 18. Then resilient forces of the resilient member 14 will move pedal 16 and the operator in the opposite direction. If the change in energy stored in resilient member 14 is predominant over work output and energy dissipated through friction, in this movement, the position of pedal 16 and the operator will be at least roughly restored upon relaxation, that is, releasing of energy from resilient member 14. The pedal, the operator, the resilient member, and the movement, that is, the spring drive 10 thus might act as a mass-spring system.

In this application, the spring of the mass-spring system is described as a single spring which could replace resilient member 14 and the vibrating mass of the mass-spring system is described as being that of the pedal and operator. This simplified description shall include the mass of the spring where appropriate.

The spring drive 10, as a mass-spring system, may execute forced vibration due to excitation caused by impulses supplied to pedal 16 by the operator in a roughly periodic manner.

The forced vibrations of the mass-spring system are inherently damped. Damping occurs because some energy of the vibrating system is discharged during each oscillation in the form of output work and energy dissipated through friction. Both the output forces and dissipative forces act as damping forces decreasing energy in the vibrating mass-spring system and in this application, are referred to as damping in the mass-spring system.

In the case of the spring drive scooter 20, the output forces are friction forces of wheel 24 on the substrate to resist kinetic friction of wheels 22, 24 on the substrate, air resistance of scooter 20 and the operator at a desired speed, and inertia forces of scooter 20 and the operator when accelerated. Dissipative forces are friction forces in all parts of the spring drive scooter 20.

It may be desirable that the spring drive 10 of the invention acts approximately as if it were a simple or linear mass-system with one degree of freedom subject to damping at least roughly linear with pedal 16 velocity. If a simple mass-spring system with one degree of freedom freely vibrates, in the absence of an exciting force and damping, its motion is harmonic at a characteristic frequency which is called its natural frequency. This simple mass-spring system possesses a single natural frequency of vibration. Certain actual mass-spring system may have more than one resonant frequency. A very small input force at that frequency, again ignoring damping, produces an infinite response. When damping is considered, the response is finite and its frequency changes slightly from the natural frequency to what is referred to in this application as the resonant frequency. Vibration at the resonant frequency results in small impulses producing a large amplitude of displacement. The amplitude of displacement is a function of damping in the system, roughly, the smaller damping the larger amplitudes of vibration.

If damping is light, that is, less than critical, then vibration of a simple mass-spring system in response to the single impulse is oscillatory and occurs about a rest position. If this mass-spring system is excited by roughly periodic impulses, the motion of pedal 16 and the operator is periodic at the excitation frequency and occurs about the rest position.

If damping of a simple mass-spring system is heavy, that is, critical or over-critical, then, in response to the single impulse, pedal 16 and the operator are restored, at least roughly, in position relatively slowly and without any overshoot. The motion is nonoscillatory with respect to the rest position. If this mass-spring system is excited by roughly periodic impulses supplied by the operator in one direction only, the motion of pedal 16 and the operator is periodic at the excitation frequency and occurs over or under, but not about, the rest position in accordance with the direction of those impulses.

It is desirable for the spring drive 10 and the spring drive scooter 20 of the invention that damping of the system be less than critical and as little as possible. Stated another way, it is desirable that friction in all parts of the spring drive 10 and the spring drive scooter 20 be as little as possible and the mechanical advantage of movement 18 be as big as possible.

With at least roughly periodic impulses supplied by the operator, vibration will start and then become a forced vibration, that is, a vibration at the forcing frequency, which is the frequency of the impulses supplied to pedal 16 by the operator. Pedal 16 will have travel or pedal stroke, between an upper travel position and a lower travel position. In the presence of limiters 154, those positions may coincide with upper and lower maximum positions of pedal 16. The vibration of pedal 16 from a rest position to the upper travel position and from the rest position to the lower travel position may not necessarily be the same, depending on such factors as damping and non-linear stiffness of resilient member 14. If the travel positions do not coincide with the maximum positions, the vibration of pedal 16 both upward and downward from the rest position can be increased or decreased by increasing or decreasing respectively the impulses applied to pedal 16 at a constant forcing frequency.

To increase the speed of the output delivered by movement 18, the operator must either increase the amplitude of displacement of the pedal 16 at a constant frequency or increase the frequency of vibration at a constant amplitude of displacement or both. When the amplitude of displacement of pedal 16 cannot be increased, for instance due to presence of limiters 154, the frequency of vibration increases and varies from the resonant frequency thus the operator has to increase his efforts. Damping forces increase with any increase of the operating speed of the output and they provide, in effect, a governor on the speed of the output produced by movement 18.

It is desirable that a resonant frequency of pedal 16, operator, and resilient member 14 be in a range of forcing frequencies within the capability of the operator. Stated another way, it is desirable that the operator be able to make the mass-spring system of the spring drive 10 of the invention resonate. For the purposes of this application any reference to the capabilities of an operator refers not to a specific individual but rather to a class of operators reasonably related to a particular use of the spring drive 10 or spring drive scooter 20 of the invention and their expected capabilities.

Practical frequencies for a spring drive scooter 20 of the invention are limited by the ability of a person to provide impulses to pedal 16. A desirable range of frequencies of vibration of pedal 16 is between about 20 cycles per minute and about 150 cycles per minute or more desirably between about 40 cycles per minute and about 80 cycles per minute. It is desirable that the resonant frequency of the spring drive 10 and spring drive scooter 20 be in the upper half of a desirable range of frequencies. It is desirable that the spring drive 10 operates with full displacement at a single resonant frequency. If resilient member 14 is linear, the farther a forcing frequency is from the resonant frequency, the more exertion is required of an operator. A resonant frequency in the upper half of a desirable operating range makes it at least relatively easy to operate the spring drive 10 at a relatively rapid "cruising speed" and makes acceleration above the "cruising speed" within the desirable range of frequencies.

It is desirable that all frequencies between at least a minimal frequency and at least about the resonant frequency, the operator be capable of supplying impulses, which can cause forced vibration with a full range of displacement of pedal 16 from the rest position. The minimal frequency represents the lowest frequency at which the spring drive 10 or spring drive scooter 20 of the invention could or would be expected to be used. This minimal frequency may be zero where for example, with a modified scooter 20 of the invention, having gears directly linking pedal 16 and final driven wheel 22, push starting or the equivalent might necessarily move pedal 16 over a displacement and at a velocity such that a minimal frequency would be that arrived at immediately after push starting.

An example of the spring drive scooter 20 shown in FIGS. 1 and 2 might have a resonant frequency of 45 cycles per minute, a desired maximum input of eight pounds, an operator weight of 80 lbs., a stiffness of 3.7 lbs. per inch, a selected maximum amplitude of vibration of two inches, and a resulting a maximum velocity of pedal 16 of 8.2 inches per second. If movement 18 has mechanical advantage of about one to thirty, this will allow the scooter 20 to achieve a maximum speed of about 12 miles per hour.

The spring drive 10, as damped, has a damping factor which in the case of a simple mass-spring system and damping linear with velocity of pedal 16, may be calculated; or which otherwise may generally be at last roughly estimated by the following equations:

$$D = \frac{C}{2\,(k\,m)^{\frac{1}{2}}}$$

or, $$D = \frac{C}{C_{(critical)}}$$

where D is the damping factor, C is the damping constant describing the damping forces which always oppose the velocity, $C_{(critical)}$ is the damping constant at critical damping, k is the spring constant of the resilient member 14, and m is the vibrated mass. In the linear system the angular frequency equals the square root of the quotient of the spring constant divided by the mass vibrated:

$$2\pi f = \omega = (k/m)^{\frac{1}{2}}$$

where f is the frequency in cycles/time and where $\omega$ is the angular frequency. The angular frequency is the frequency in radians traversed per unit time, which is equal to $2\pi$ times the frequency in cycles per unit time.

The lower the damping factor is, the greater is the response of the pedal 16 and operator to an impulse of a particular magnitude at a particular frequency. This effect is particularly advantageous at or near the resonant frequency.

It is desirable that the damping factor for the spring drive of the invention, for dissipative forces only, and over a desired range of forcing frequencies, be less than or equal to about 0.3.

An approximate damping factor may be, for example, experimentally determined as indicated by the following equation:

$$D = \frac{d}{2\pi}$$

where d is the logarithmic decrement, which is the natural logarithm of the ratio of the amplitude of displacement of two consecutive cycles of vibration of pedal 16 and the operator. It is desirable to have the highest calculated damping factor of a spring drive 10 of the invention less than 0.3 over a desired range of forcing frequencies as calculated according to the highest logarithmic decrement obtained in a series of experimental determinations of logarithmic decrements. An approximate stiffness of resilient member 14, in the case of a non-linear resilient member 14, would be roughly represented by spring rate "k" of the resilient member 14 averaged over the range of displacements used in making the measurements of logarithmic decrement.

The experimental value for approximate damping factor or approximate highest damping factor as well as the approximate stiffness of resilient member 14 may also be interposed in the first equation above to provide estimates of damping in the actual mass-spring system. In making such estimates, the damping constant in the equation can be considered, at least roughly to remain a constant.

The estimate of average spring rate may be useful in determining which resilient member 14 of a set of resilient members 14, of the same type but differing stiffness, to use with a particular configuration of 22 spring drive 10 to obtain an optimum range of required impulses for a desired amplitude of displacement of a pedal, within a desired range of frequencies of forced vibration and with an operator and pedal of a selected mass. If non-linearities prevent this from being the case, a less non-linear type of resilient member 14 could be selected instead.

While a specific embodiment of the invention has been shown and described herein for purposes of illustration, the protection afforded by any patent which may issue upon this application is not limited strictly to the disclosed embodiment; but extends to all structures and arrangements which contain the essence of the invention and which fall fairly within the scope of the claims which are appended hereto.

What is claimed is:

1. A spring drive scooter for use by an operator, said spring drive scooter comprising a frame, said frame including a steering mechanism and one or more front wheels, a resilient member connected to said frame, a pedal supported by said resilient member, said pedal being disposed to bear said operator, said pedal, said operator, and said resilient member exhibiting oscillatory motion relative to said frame in response to at least roughly periodic impulses supplied to said pedal by said operator at a range of frequencies including a resonant frequency, and a movement connected to said frame, said movement being actuated by reciprocation of said pedal, said movement including a transmission actuated by said pedal and at least one final driven wheel actuated by said transmission, said transmission comprising a linear element operatively coupled to said pedal and a circular element operably coupled to said final driven wheel by means of an overrunning clutch, whereby said linear element is capable of turning said circular element during said vibration of said pedal.

* * * * *